(12) United States Patent
Jackson

(10) Patent No.: US 6,411,445 B1
(45) Date of Patent: Jun. 25, 2002

(54) OPTICAL SYSTEM WITH CENTER-BORED CATADIOPTRIC IMAGING LENS

(75) Inventor: Jeremie E. Jackson, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/599,374

(22) Filed: Jun. 22, 2000

(51) Int. Cl.[7] .................. G02B 17/00; G02B 31/06; G02B 3/00
(52) U.S. Cl. .................. 359/726; 359/642; 359/648; 359/711
(58) Field of Search ................ 359/642, 648, 359/726, 727, 728, 711, 731, 729, 725, 637, 815, 554, 894, 511; 244/3.17

(56) References Cited

U.S. PATENT DOCUMENTS

| | | | | |
|---|---|---|---|---|
| 4,106,855 A | * | 8/1978 | Coon | .................. 359/723 |
| 5,220,159 A | * | 6/1993 | Friedenthal | .............. 250/201.9 |
| 5,854,713 A | * | 12/1998 | Kuroda et al. | .............. 359/850 |
| 5,946,143 A | * | 8/1999 | Whalen | ...................... 359/728 |
| 6,028,712 A | | 2/2000 | Mckenney et al. | ......... 359/642 |
| 6,198,564 B1 | * | 3/2001 | Knight | ....................... 359/214 |

\* cited by examiner

Primary Examiner—Georgia Epps
Assistant Examiner—Tim Thompson
(74) Attorney, Agent, or Firm—Gregory O. Garmong; Colin M. Raufer; Glenn H. Lenzen, Jr.

(57) ABSTRACT

An optical system has an outer dome and a detector system with an optical train and a sensor disposed to receive an optical ray passing sequentially through the outer dome and the optical train. The optical train includes a solid catadioptric imaging lens which is symmetric about a lens axis. The solid catadioptric imaging lens has a bore therethrough coincident with the lens axis, to prevent stray light from reaching the sensor. The bore is desirably filled with an opaque material or has a ground glass wall.

20 Claims, 3 Drawing Sheets

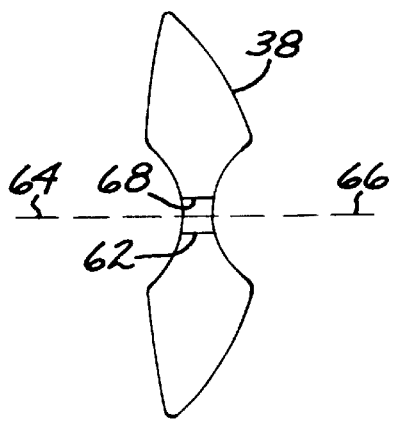
FIG. 5
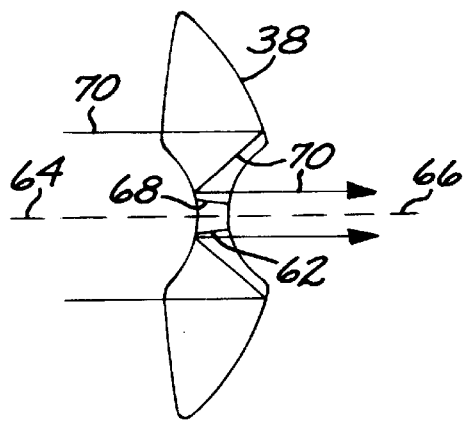
FIG. 6
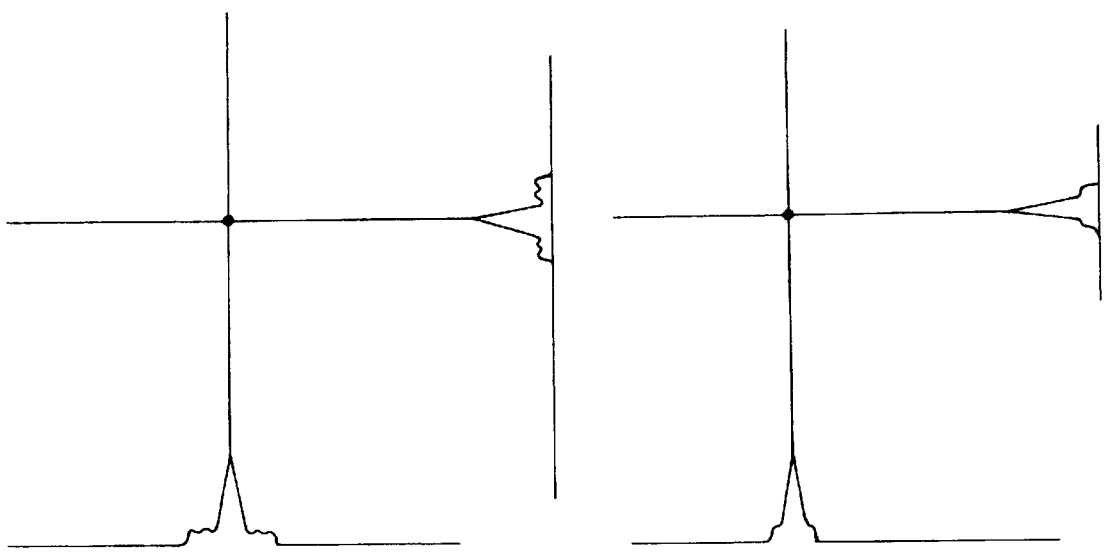
FIG. 7
FIG. 8

OPTICAL SYSTEM WITH CENTER-BORED CATADIOPTRIC IMAGING LENS

This invention relates to optical systems having a dome window and an optical system with an imaging lens such as a solid catadioptric imaging lens, and, more particularly, to avoiding ghost images that may otherwise be visible at the sensor of such optical systems.

BACKGROUND OF THE INVENTION

An optical system includes an optical train with a sensor that receives radiated energy from a scene and converts it to an electrical signal. The electrical signal is provided to a display or further processed for automated pattern recognition or the like. The sensor is fragile and is easily damaged by dirt, erosion, chemicals, or high air velocity.

In service, the sensor is placed behind a transparent, dome-shaped window through which it views the scene and which protects the sensor from such external effects. In some cases, the dome may be spherical. If the dome is nonspherical, highly curved, and thick, it introduces significant wavefront aberration into the optical rays that pass through it on the way to the sensor. As discussed in U.S. Pat. No. 6,028,712, a transparent optical corrector in the optical path may be placed between the dome and the sensor to compensate for the aberration introduced by the nonspherical window.

In a number of such optical systems, a catadioptric (also sometimes termed "catadioptic") imaging lens is used in the optical train. Light passing through the dome and the optical corrector, if any, is refracted and reflected by the catadioptric lens to the sensor. The catadioptric lens combines a transmissive entrance window, a reflective primary, a reflective secondary, and a transmissive exit pupil into a single optical element.

Although the catadioptric lens is quite efficient, it and other types of lenses suffer from the problem that reflections from the dome or the optical correctors, if any, and from the front side of the catadioptric lens itself may reach the sensor as a ghost image. An analogy, although somewhat imperfect, is the pattern that may sometimes be seen as the reflection from the windshield by the driver of an automobile. Under the right light conditions, the driver may see reflections in the windshield of the interior of the automobile or of objects outside the automobile that are not in the viewed scene. The pattern recognition system of the human mind can normally distinguish the viewed scene from the reflected pattern, but the pattern recognition systems of presently available image processors are not that sophisticated. This type of stray-light image is thus extremely difficult to distinguish from the intended image.

There is a need for an approach to preventing stray light ghost images arising from catadioptric lenses from interfering with the sensing of a scene in an optical system. The present invention fulfills this need, and further provides related advantages.

SUMMARY OF THE INVENTION

The present invention provides an optical system having a dome and, depending upon the type of dome, an optical corrector. Light reaches a sensor by passing through an optical train that includes a solid catadioptric imaging lens (sometimes termed a solid "catadioptic" or "cat" lens). The solid catadioptric imaging lens is modified so avoid ghost images that otherwise may reach the sensor and be misinterpreted. The functionality of the solid catadioptric imaging lens is not adversely affected. The present approach does not require any modification of the sensor and avoids the need to expend large amounts of computational power to distinguish ghost images.

In accordance with the invention, an optical system comprises an outer dome, and a detector system comprising an optical train including a solid catadioptric imaging lens which is symmetric about a lens axis. The solid catadioptric imaging lens has a bore therethrough coincident with the lens axis. (The catadioptric imaging lens is a "solid" catadioptric imaging lens, meaning that it incorporates reflective and refractive elements into a single physical component.) The detector system further includes a sensor disposed to receive an optical ray passing sequentially through the outer dome and the optical train.

The bore is positioned to block the stray light rays that originate due to the ghost effect in the optical system due to the presence of the solid catadioptric imaging lens. The bore maximum diameter is sufficiently small that the bore does not interfere with the light rays from the scene that are of interest. The stray light originating from this source is therefore removed from the optical path before it can reach the sensor.

The bore may be cylindrically symmetric or have another shape such as a frustum of a cone. The bore may be filled with an opaque material, or it may have its interior surface ground. The bore preferably has an interior surface whose maximum distance from the lens axis is substantially equal to an inner rim ray diameter of the optical system.

The outer dome may comprise a segment of a sphere, in which case no optical corrector is needed in most instances. The outer dome may not be a segment of a sphere, in which case an optical corrector may be positioned between the dome and the detector system. The optical corrector comprises a transparent body having an optical corrector shape responsive to a shape of the outer dome and positioned in an optical path between the outer dome and the detector system.

Preferably, the detector system is mounted on a movable optical train support. The movable optical train support is typically a gimbal, such as a rollnod gimbal or an x-y gimbal.

To achieve further reduction in stray light, the optical system may include at least one baffle positioned in the optical path between the outer dome and the detector system and fixed in space relative to the central axis, each baffle comprising a frustoconical tube that is rotationally symmetric about the central axis.

The present approach allows the use of the efficient solid catadioptric imaging lens in the optical train, but avoids the potential problem with ghost images. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is an enlarged sectional view along a diameter of the solid catadioptric imaging lens with a cylindrical bore;

FIG. 6 is an enlarged sectional view along a diameter of the solid catadioptric imaging lens with a frustoconical bore and an indicated inner rim ray of the image;

FIG. 7 is a graph of intensity as a function of position showing the performance of the optical system with the conventional solid catadioptric imaging lens having no center bore; and FIG. 8 is a graph of intensity as a function of position showing the performance of the optical system with the center-bored solid catadioptric imaging lens.

DETAILED DESCRIPTION OF THE INVENTION

Figure 1:
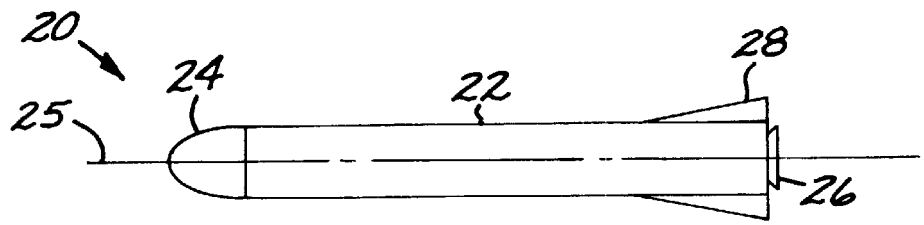
FIG. 1 is a schematic elevational view of a missile having an optical system.

FIG. 1 depicts a flight vehicle, in this case a supersonic missile 20, having a fuselage 22 with a curved outer dome window 24 ("outer dome") attached to a forward end of the fuselage. The outer dome 24 is illustrated as a nose dome that protrudes at least partially into the airstream of the missile 20. The fuselage 22 is elongated along a central axis 25, and in a preferred application the outer dome 24 is rotationally symmetric about the central axis 25. By "rotationally symmetric" is meant that the three-dimensional shape, here of the outer dome 24, may be generated by the rotation of a curve or line about the central axis 25. The outer dome 24 may be a segment of a sphere, or it may be nonspherical. The missile 20 further includes a rocket motor 26 within the fuselage 22 and guidance surfaces 28 attached to the fuselage 22. The missile 20 with the nose-dome 24 is the preferred application of the optical system of the invention, but it is applicable in other contexts as well such as other missile domes and domes on manned aircraft.

The nonspherical outer dome 24 is part of an optical system 30. The optical system 30 further includes a detector system 32 having a sensor 34 mounted in a dewar 36. The sensor 34 is preferably an infrared focal plane array (FPA) sensor, as known in the art. An optical train, here including a solid catadioptric imaging lens 38, guides and focuses an intended optical ray 40 traveling along an optical path (coincident with the optical ray 40) from a scene to the sensor 34. (The term "catadioptric" is sometimes referred to as "catadioptic", and the present usage includes both terms. The term "cat" applied to a lens is sometimes used to abbreviate both terms.) The catadioptric imaging lens 38 is a "solid" catadioptric imaging lens, meaning that it incorporates reflective and refractive elements into a single physical component. The detector system 32, including the sensor 34, the dewar 36, and the lens 38 is mounted on a gimbal, whose transverse rotational axis is represented at numeral 42. The illustrated gimbal is a roll-nod gimbal that nods about the transverse axis 42 and rolls about the central axis 25, but other types of gimbals, such as an x-y gimbal, may be used.

In those cases where the outer dome 24 is nonspherical, it is preferred that an optical corrector 44 be positioned in the optical path optically between the outer dome 24 and the detector system 30. The optical corrector 44 comprises at least one body which is transparent to the wavelengths detected by the sensor 34 and having an optical corrector shape responsive to a shape of the outer dome 24. In the illustration, the optical corrector 44 includes two bodies 44a and 44b, but more or fewer could be present. The optical corrector 44 is affixed to the fuselage 22, and immovable relative thereto, in the illustrated embodiment, but the optical corrector 44 could be movable. The structure and use of optical correctors are discussed more fully in U.S. Pat. No. 6,028,712.

Figure 2:
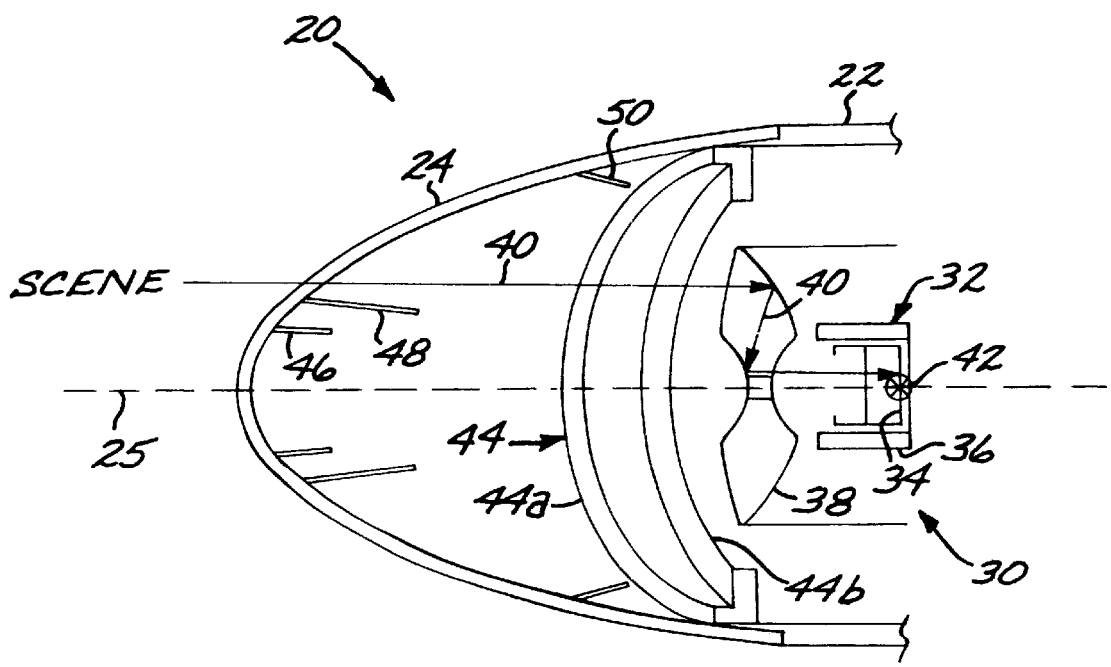
FIG. 2 is a schematic elevational view of the internal structure of the forward end of the missile.

Optionally, at least one light baffle is positioned in the optical path between the outer dome 24 and the detector system 32. There may be one baffle, two baffles, three baffles, or more. In general, it is preferred to use as few baffles as necessary to perform the desired baffling of stray light, as increasing numbers of baffles adversely affect the intended light reaching the sensor from the scene, and also because it becomes increasingly difficult to position, align, and attach larger numbers of baffles within the interior space of the nose dome 24. The baffles are fixed in space relative to the central axis 25. That is, the baffles are not gimbaled to move with the detector system 32. In FIG. 2, three baffles 46, 48, and 50 are illustrated. Each baffle 46, 48, and 50 comprises an optically opaque frustoconical tube that is rotationally symmetric about the central axis 25.

The solid catadioptric imaging lens 38 is a highly efficient lens that integrates refractive and reflective functions into a single component structure. The solid catadioptric imaging lens 38 combines a transmissive entrance window, a reflective primary, a reflective secondary, and a transmissive exit pupil into a single optical component structure.

Figure 3:
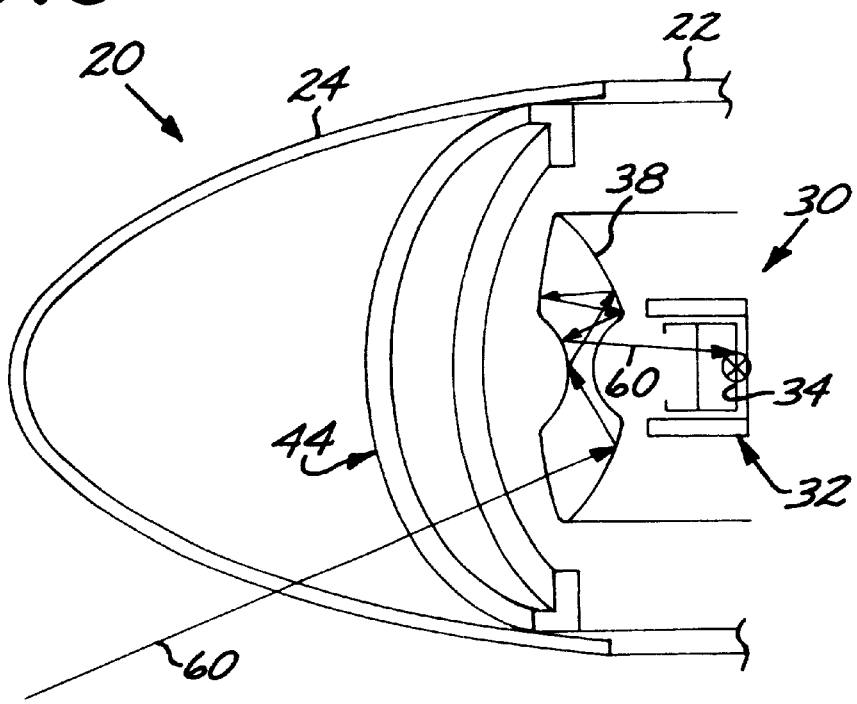
FIG. 3 is a diagrammatic indication of a ray path of a stray light ray in the absence of a bore in the solid catadioptric imaging lens.

However, the solid catadioptric imaging lens 38 may produce ghost imaging at the sensor 34 by single reflection events. The ghost image is one form of stray light, created by Fresnel reflections from the optical surfaces. FIG. 3 illustrates a ghost-image light ray 60 that may reach the sensor 34 in the absence of the approach of the invention.

Figure 4:
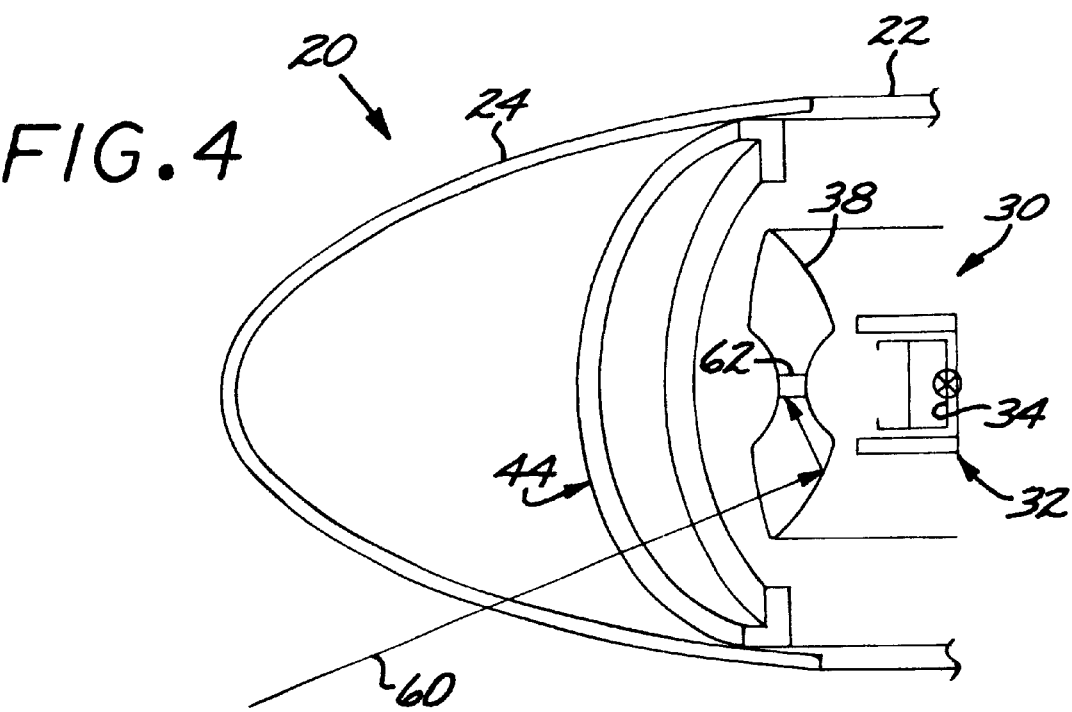
FIG. 4 is a diagrammatic indication of a ray path of a stray light ray when there is a bore in the solid catadioptric imaging lens.

The ghost-image ray 60 may be blocked from reaching the sensor 34 by creating a bore 62 in the center of the solid catadioptric imaging lens 38. The bore 62 is either hollow with a ground glass inner surface so that it does not reflect light, or filled with a solid, opaque material. In any event, the bore 62 does not transmit light transversely thereto. Studies of the optical path of possible ghost-image rays 60 show that these rays pass through this center region of the solid catadioptric imaging lens 38, and that blocking such passage prevents the ghost image at the sensor 34 resulting from these ghost-image rays 60. FIG. 4 illustrates how the ghost-image ray 60 is blocked from reaching the sensor 34 by the presence of the opaque bore 62.

FIGS. 5 and 6 illustrate the bore 62 and its relation to the solid catadioptric imaging lens 38 in greater detail. The solid catadioptric imaging lens 38 is circularly symmetric about a lens axis 64. An axis 66 of the bore 62 is coincident with the lens axis 64. The bore may be either cylindrical, as illustrated in FIG. 5, or of another shape such as a frustum of a cone, as illustrated in FIG. 6. The bores 62 of FIGS. 5 and 6 are transversely opaque, but are shown as line elements for clarity. The remainder of the solid catadioptric imaging lens 38 is transparent to the light sensed by the sensor 34.

The dome 24 and the optical corrector 44 (if any) are designed by a standard ray path technique such as the Code V software. The infinite number of ghost-image ray paths 60 are then simulated by the standard ASAP (Advanced System Analysis Program) software, and the diameter of the bore 62 is selected using the ASAP software. (In the case of a shape of the bore 62 that is not uniform along its length, the "bore diameter" is the maximum diameter or distance from the bore axis 66.) No single bore diameter is suitable for all optical systems 30. Generally, however, the bore diameter is selected such that the maximum distance of an interior surface 68 from the bore axis 66 and the lens axis 64 is substantially equal to an inner rim ray diameter of the optical system. An inner ray path 70 of the optical system 30 is illustrated in FIG. 6. If the bore diameter is made larger than the diameter defined by this inner ray path, then the bore will block light rays 40 from the scene, so that the ability to perceive features in the scene will be degraded. In the obscured system such as that having the opaque bore of FIGS. 4–6, the central portion of the ray bundle is already blocked by the back side of the secondary mirror portion of the solid catadioptric imaging lens 38. As long as the bore is within this image shadow, it does not further block any portion of the desired image.

The present invention has been reduced to practice in a computer simulation using the Code V and ASAP optical software discussed earlier, and an exemplary dome 24 and optical corrector 44. FIG. 7 illustrates the optical performance when there is no bore 62 present in the solid catadioptric imaging lens 38. FIG. 8 illustrates the optical performance in terms of energy incident on the sensor 34, when there is a bore 62 present in the solid catadioptric imaging lens 38. In the graph of FIG. 7, there are side lobes that indicate the presence of the ghost image on either side of the main energy distribution. These side lobes are absent in the graph of FIG. 8, indicating the absence of the ghost image.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system, comprising:

an outer dome; and a detector system comprising an optical train including a solid catadioptric imaging lens which is symmetric about a lens axis, the solid catadioptric imaging lens having a bore therethrough coincident with the lens axis, and a sensor disposed to receive an optical ray passing sequentially through the outer dome and the optical train.

2. The optical system of claim 1, wherein the outer dome comprises a segment of a sphere.

3. The optical system of claim 1, wherein the outer dome is not a segment of a sphere.

4. The optical system of claim 1, wherein the outer dome is not a segment of a sphere, and wherein the optical system further includes an optical corrector comprising a transparent body having an optical corrector shape responsive to a shape of the outer dome and positioned in an optical path between the outer dome and the detector system.

5. The optical system of claim 1, wherein the detector system is mounted on a movable optical train support.

6. The optical system of claim 1, further including at least one baffle positioned in the optical path between the outer dome and the detector system and fixed in space relative to the central axis, each baffle comprising a frustoconical tube that is rotationally symmetric about the central axis.

7. The optical system of claim 1, wherein the bore is cylindrically symmetric.

8. The optical system of claim 1, wherein the bore is shaped substantially as a frustum of a cone.

9. The optical system of claim 1, wherein the bore is filled with an opaque material.

10. The optical system of claim 1, wherein the bore has an interior surface which is ground.

11. The optical system of claim 1, wherein the bore has an interior surface whose maximum distance from the lens axis is substantially equal to an inner rim ray diameter of the optical system.

12. An optical system, comprising:

an outer dome that is not a segment of a sphere; and a detector system comprising an optical train including a solid catadioptric imaging lens having a reflective primary, a reflective secondary, and refractive elements incorporated into a single physical component, the solid catadioptric imaging lens being symmetric about a lens axis and having a bore therethrough coincident with the lens axis, and a sensor disposed to receive an optical ray passing sequentially through the outer dome and the optical train.

13. The optical system of claim 12, wherein the optical system further includes an optical corrector comprising a transparent body having an optical corrector shape responsive to a shape of the outer dome and positioned in an optical pat between the outer dome and the detector system.

14. The optical system of claim 12, wherein the detector system is mounted on a movable optical train support.

15. The optical system of claim 12, further including at least one baffle positioned in the optical path between the outer dome and the detector system and fixed in space relative to the central axis, each baffle comprising a frustoconical tube that is rotationally symmetric about the central axis.

16. The optical system of claim 12, wherein the bore is cylindrically symmetric.

17. The optical system of claim 12, wherein the bore is shaped substantially as a frustum of a cone.

18. The optical system of claim 12, wherein the bore is filled with an opaque material.

19. The optical system of claim 12, wherein the bore has an interior surface which is ground.

20. The optical system of claim 12, wherein the bore has an interior surface whose maximum distance from the lens axis is substantially equal to an inner rim ray diameter of the optical system.

* * * * *

UNITED STATES PATENT AND TRADEMARK OFFICE
CERTIFICATE OF CORRECTION

PATENT NO. : 6,411,445 B1
DATED : June 25, 2002
INVENTOR(S) : Jeremie E. Jackson It is certified that error appears in the above-identified patent and that said Letters Patent is hereby corrected as shown below:

Column 1,
Line 3, please insert -- This invention was made with Government support under Contract No. DAAH01-97-C-0084 awarded by The Advanced Research Projects Agency under Prime Contract No. MDA972-96-C-0800. The Government has certain rights in this invention --.

Signed and Sealed this

Eleventh Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,411,445 B1  Page 1 of 1
DATED : June 25, 2002
INVENTOR(S) : Jeremie E. Jackson It is certified that error appears in the above-identified patent and that said Letters Patent is hereby corrected as shown below:

<u>Column 1,</u>
Line 3, please insert -- This invention was made with Government support under Contract No. DAAH01-97-C-0084 awarded by the Department of the Army. The Government has certain rights in this invention. --.

Signed and Sealed this

Twenty-first Day of October, 2003

JAMES E. ROGAN
*Director of the United States Patent and Trademark Office*